(12) United States Patent
Richards

(10) Patent No.: US 11,099,399 B2
(45) Date of Patent: Aug. 24, 2021

(54) SMART PHONE MAGNIFIER ASSEMBLY

(71) Applicant: Kevin Richards, Howard Beach, NY (US)

(72) Inventor: Kevin Richards, Howard Beach, NY (US)

(*) Notice: Subject to any disclaimer, the term of this patent is extended or adjusted under 35 U.S.C. 154(b) by 265 days.

(21) Appl. No.: 16/360,070

(22) Filed: Mar. 21, 2019

(65) Prior Publication Data

US 2020/0301155 A1 Sep. 24, 2020

(51) Int. Cl.
*G02B 27/02* (2006.01)
*G02B 1/14* (2015.01)
*G02B 1/18* (2015.01)
*H04M 1/02* (2006.01)
*G02B 25/00* (2006.01)

(52) U.S. Cl.
CPC .......... *G02B 27/027* (2013.01); *G02B 1/14* (2015.01); *G02B 1/18* (2015.01); *G02B 25/002* (2013.01); *G02B 27/025* (2013.01); *G02B 27/026* (2013.01); *H04M 1/027* (2013.01)

(58) Field of Classification Search
CPC .......... G02B 27/027; G02B 1/14; G02B 1/18; G02B 27/026; G02B 27/025; G02B 25/002; H04M 1/027

USPC .......................................... 359/801
See application file for complete search history.

(56) References Cited

U.S. PATENT DOCUMENTS

| | | | |
|---|---|---|---|
| 6,067,459 A | 5/2000 | Lincoln | |
| 8,922,918 B1 | 12/2014 | Morris | |
| 9,195,046 B2 * | 11/2015 | Fields | G02B 1/041 |
| D747,320 S | 1/2016 | Snyder | |
| 9,268,140 B2 * | 2/2016 | Feola | G02B 27/025 |
| 2011/0299168 A1 | 12/2011 | Combs | |
| 2012/0243110 A1 | 9/2012 | Robinson | |
| 2015/0362736 A1 * | 12/2015 | Kowasic | G02B 27/027 |
| | | | 359/478 |

* cited by examiner

*Primary Examiner* — Mohammed A Hasan

(57) ABSTRACT

A smart phone magnifier assembly for magnifying imagery displayed on a smart phone includes a magnifying screen that has a width ranging between approximately 3.0 inches and 5.0 inches and a length ranging between approximately 5.0 inches and 8.0 inches. In this way the magnifying screen can fit on a screen of a smart phone thereby facilitating the magnifying screen to magnify and thusly enhance visibility of imagery displayed on the screen. An adhesive layer is bonded to the magnifying screen for adhesively engaging the smart phone screen. Thus, the adhesive layer releasably retains the magnifying screen on the smart phone screen.

4 Claims, 3 Drawing Sheets

SMART PHONE MAGNIFIER ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to magnifier devices and more particularly pertains to a new magnifier device for magnifying imagery displayed on a smart phone.

BRIEF SUMMARY OF THE INVENTION

An embodiment of the disclosure meets the needs presented above by generally comprising a magnifying screen that has a width ranging between approximately 3.0 inches and 5.0 inches and a length ranging between approximately 5.0 inches and 8.0 inches. In this way the magnifying screen can fit on a screen of a smart phone thereby facilitating the magnifying screen to magnify and thusly enhance visibility of imagery displayed on the screen. An adhesive layer is bonded to the magnifying screen for adhesively engaging the smart phone screen. Thus, the adhesive layer releasably retains the magnifying screen on the smart phone screen.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
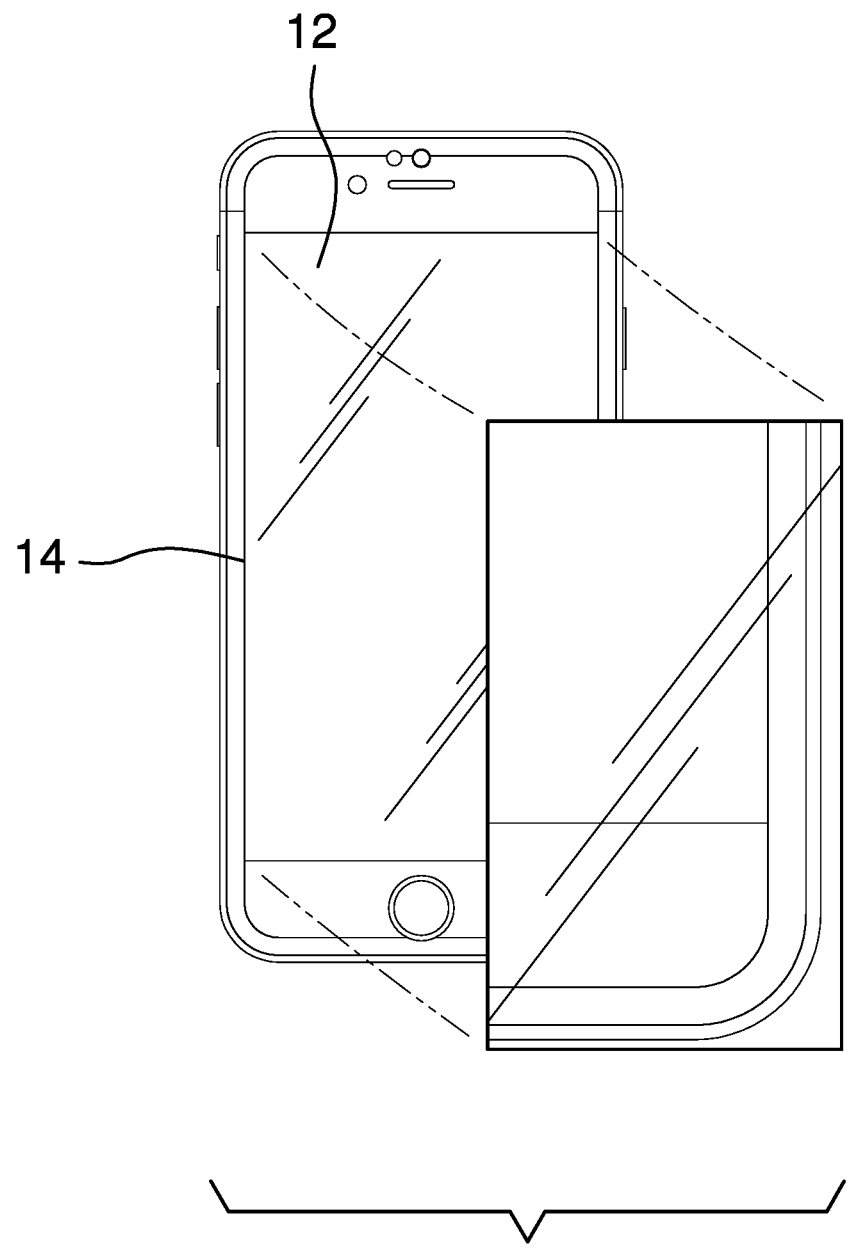
FIG. 1 is a front in-use view of a smart phone magnifier assembly according to an embodiment of the disclosure.
Figure 2:
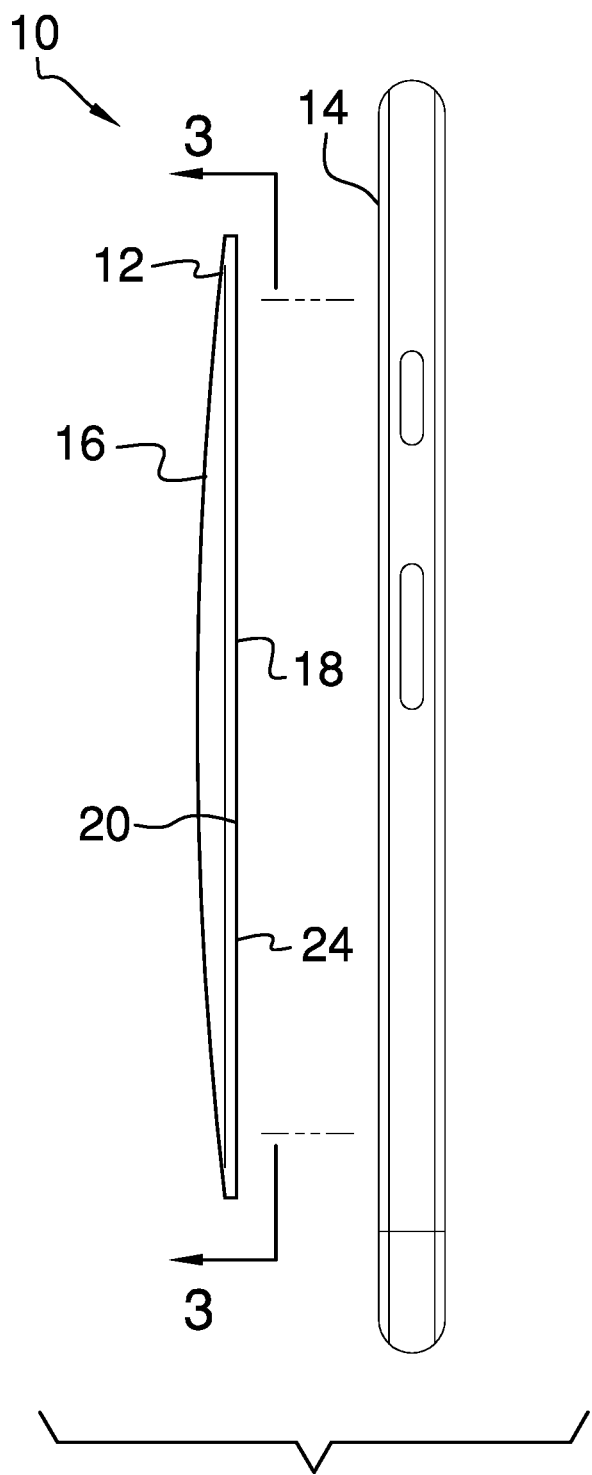
FIG. 2 is a right side exploded view of an embodiment of the disclosure.
Figure 3:
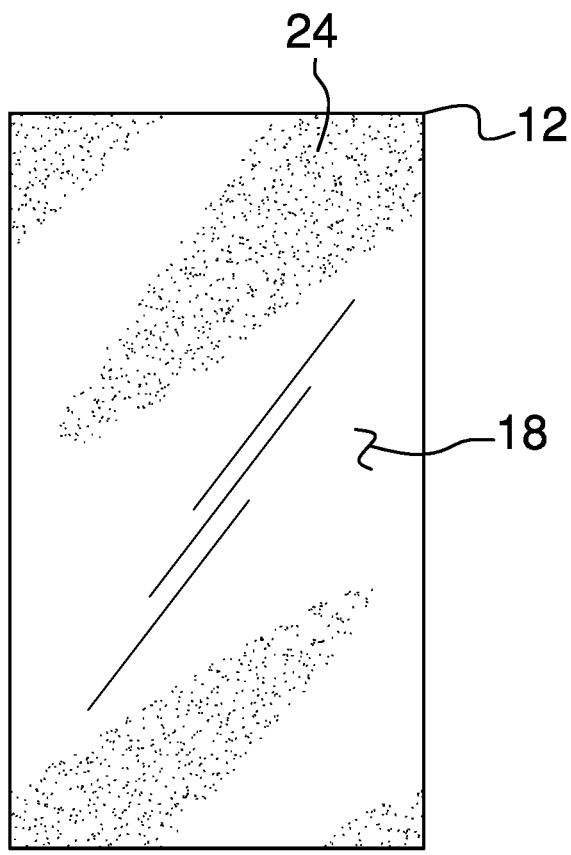
FIG. 3 is a back view of a magnifying screen of an embodiment of the disclosure.
Figure 4:
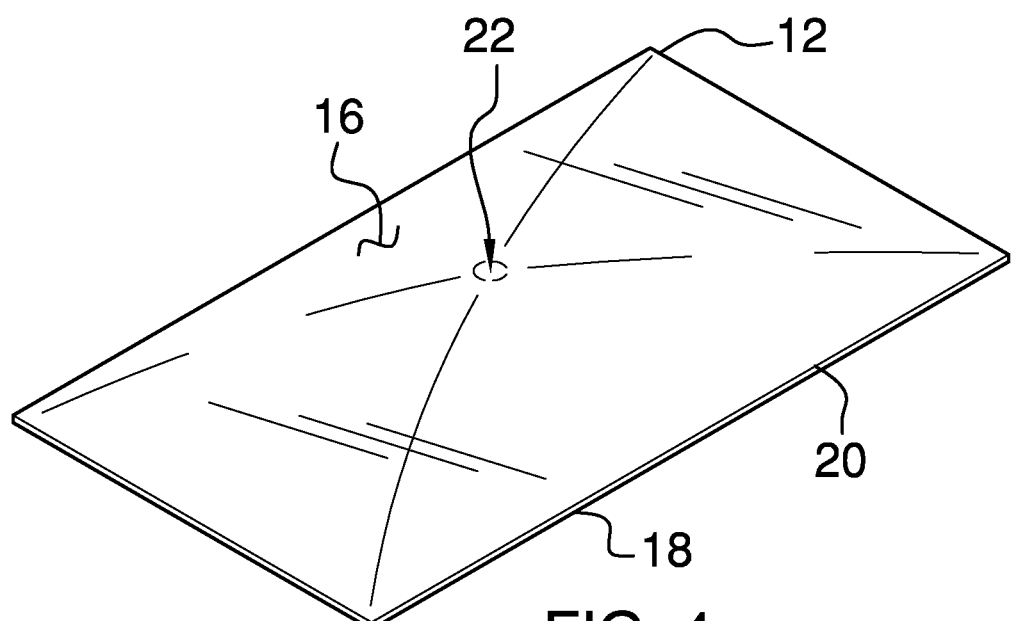
FIG. 4 is a top perspective view of a magnifying screen of an embodiment of the disclosure.

With reference now to the drawings, and in particular to FIGS. 1 through 4 thereof, a new magnifier device embodying the principles and concepts of an embodiment of the disclosure and generally designated by the reference numeral 10 will be described.

As best illustrated in FIGS. 1 through 4, the smart phone magnifier assembly 10 generally comprises magnifying screen 12 that has a width ranging between approximately 3.0 inches and 5.0 inches and a length ranging between approximately 5.0 inches and 8.0 inches. In this way the magnifying screen 12 can fit on a screen 14 of a smart phone to magnify and thusly enhance visibility of imagery displayed on the smart phone screen 14. Thus, a user can clearly view the imagery on displayed on the smart phone screen 14 from a distance that would otherwise be prohibitive for clearly viewing the imagery. In this way a driver of a commercial vehicle, for example, can clearly view gps directions, or other imagery, displayed on the smart phone screen 14 while the smart phone is mounted on a dashboard or the like. Additionally, the magnifying screen 12 can be applied to any electronic device that has an electronic display.

The magnifying screen 12 is comprised of a translucent material to pass light therethrough and the magnifying screen 12 has a front surface 16, a back surface 18 and a perimeter edge 20 extending therebetween. The front surface 16 is concavely arcuate with respect to the back surface 18 such that the magnifying screen 12 magnifies light passing in a direction moving from the back surface 18 through the front surface 16. The curvature of the front surface 16 may have an apex 22 that is centrally positioned on the magnifying screen 12. The magnifying screen 12 may be comprised of an electrically conductive material such that the magnifying screen 12 does not interfere with the function of a touch screen on the smart phone, including touch screens that are capable of recognizing hand gestures that do not involve physical contact with the touch screen.

An adhesive layer 24 is bonded to the magnifying screen 12 for adhesively engaging the smart phone screen 14. In this way the adhesive layer 24 releasably retains the magnifying screen 12 on the smart phone screen 14. The adhesive layer 24 is positioned on the back surface 18 of the magnifying screen 12 and the adhesive layer 24 is comprised of a translucent material to pass light therethrough. Moreover, the adhesive layer 24 is comprised of a non-residual, multiple use adhesive material thereby facilitating the magnifying screen 12 to be removed and reattached to the smart phone screen 14 multiple times.

In use, the magnifying screen 12 is positioned on the smart phone screen 14 for magnifying imagery displayed on the smart phone screen 14. In this way a user can clearly view the imagery on the smart phone screen 14 from a distance that would otherwise be prohibitive for clearly viewing the imagery. Additionally, the magnifying screen 12 facilitates the user to clearly view the imagery without having to put on reading glasses or other magnifying tools for viewing the imagery. In this way a commercial vehicle driver, for example, can clearly view the imagery displayed on the smart phone screen 14 while the smart phone is mounted on the dashboard or other location that is at least arm's length away from the user. The magnifying screen 12 can be removed from or reapplied to the smart phone screen 14 at any time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smart phone magnifier assembly being configured to magnify images on a screen of a smart phone for enhancing visibility of the screen, said assembly comprising:
    a magnifying screen having a width ranging between approximately 3.0 inches and 5.0 inches and a length ranging between approximately 5.0 inches and 8.0 inches wherein said magnifying screen is configured to fit on a screen of a smart phone thereby facilitating said magnifying screen to magnify and thusly enhance visibility of imagery displayed on the screen, wherein said magnifying screen is comprised of a translucent material wherein said magnifying screen is configured to pass light therethrough, wherein said magnifying screen has a front surface, a back surface and a perimeter edge extending therebetween, said front surface being concavely arcuate with respect to said back surface wherein said magnifying screen is configured to magnify light passing in a direction moving from said back surface through said front surface; and
    an adhesive layer being bonded to said magnifying screen for adhesively engaging the smart phone screen wherein said adhesive layer is configured to releasably retain said magnifying screen on the smart phone screen.

2. The assembly according to claim 1, wherein said adhesive layer is positioned on a back surface of said magnifying screen.

3. A smart phone magnifier assembly being configured to magnify images on a screen of a smart phone for enhancing visibility of the screen, said assembly comprising:
    a magnifying screen having a width ranging between approximately 3.0 inches and 5.0 inches and a length ranging between approximately 5.0 inches and 8.0 inches wherein said magnifying screen is configured to fit on a screen of a smart phone thereby facilitating said magnifying screen to magnify and thusly enhance visibility of imagery displayed on the screen, said magnifying screen being comprised of a translucent material wherein said magnifying screen is configured to pass light therethrough, said magnifying screen having a front surface, a back surface and a perimeter edge extending therebetween, said front surface being concavely arcuate with respect to said back surface wherein said magnifying screen is configured to magnify light passing in a direction moving from said back surface through said front surface; and
    an adhesive layer being bonded to said magnifying screen for adhesively engaging the smart phone screen wherein said adhesive layer is configured to releasably retain said magnifying screen on the smart phone screen, said adhesive layer being positioned on said back surface of said magnifying screen, said adhesive layer being comprised of a translucent material wherein said adhesive layer is configured to pass light therethrough.

4. A smart phone magnifier system comprising:
    an electronic device having a display being integrated therein wherein said display is configured to display indicia comprising imagery and words;
    a magnifying screen being removably coupled to said display, said magnifying screen being comprised of a translucent material wherein said magnifying screen is configured to pass light therethrough, said magnifying screen magnifying said indicia displayed on said display wherein said magnifying screen is configured to facilitate a user to clearly view said indicia from a distance that would otherwise be prohibitive for clearly viewing said indicia, said magnifying screen having a front surface, a back surface and a perimeter edge extending therebetween, said front surface being concavely arcuate with respect to said back surface wherein said magnifying screen is configured to magnify light passing in a direction moving from said back surface through said front surface, said magnifying; and
    an adhesive layer being bonded to said magnifying screen for adhesively engaging the smart phone screen wherein said adhesive layer is configured to retain said magnifying screen on the smart phone screen, said adhesive layer being positioned on said back surface of said magnifying screen, said adhesive layer being comprised of a translucent material wherein said adhesive layer is configured to pass light therethrough.

* * * * *